(12) United States Patent
Sun

(10) Patent No.: US 7,336,586 B2
(45) Date of Patent: Feb. 26, 2008

(54) OPTICAL PICKUP DEVICE COMPATIBLE WITH TWO TYPES OF OPTICAL RECORDING MEDIA

(75) Inventor: Wen-Hsin Sun, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 489 days.

(21) Appl. No.: 11/025,808

(22) Filed: Dec. 29, 2004

(65) Prior Publication Data
US 2005/0232118 A1 Oct. 20, 2005

(30) Foreign Application Priority Data
Mar. 30, 2004 (TW) .............................. 93108615 A

(51) Int. Cl.
*G11B 7/00* (2006.01)
(52) U.S. Cl. ...................... 369/112.16; 369/112.05; 369/112.22; 369/44.37
(58) Field of Classification Search ............ None
See application file for complete search history.

(56) References Cited

U.S. PATENT DOCUMENTS 6,154,433 A * 11/2000 Hoshino et al. ....... 369/112.04
6,590,851 B1 7/2003 Kim et al.
2005/0207316 A1* 9/2005 Ohyama ............. 369/112.16

FOREIGN PATENT DOCUMENTS

| CN | 1272942 A | 11/2000 |
|---|---|---|
| CN | 1427403 A | 7/2003 |
| KR | 20000006165 | 1/2000 |
| TW | 342493 | 10/1998 |

* cited by examiner

*Primary Examiner*—Muhammad Edun
(74) *Attorney, Agent, or Firm*—Morris Manning Martin LLP; Tim Tingkang Xia, Esq.

(57) ABSTRACT

An optical pickup device compatible with two types of optical recording media in accordance with the present invention includes: a first light source emitting a first laser beam with a first wavelength; a second light source emitting a second laser beam with a second wavelength greater than the first wavelength; an objective lens with parameters according with the first wavelength and adapted to focus the first and second laser beams on the at least two types of optical recording media; a collimating lens for collimating an incident beam of light and transmitting the collimated light beam to the objective lens; an optical path synthesizer/separator for receiving the first and second laser beams and transmitting the first and second laser beams to the collimating lens; and a compensator for correcting the second laser beams and transmitting the corrected second laser beams to the optical path synthesizer/separator.

18 Claims, 2 Drawing Sheets

OPTICAL PICKUP DEVICE COMPATIBLE WITH TWO TYPES OF OPTICAL RECORDING MEDIA

BACKGROUND OF THE INVENTION

1. Field of the Invention

The present invention generally relates to optical pickup devices used in optical disk recording and/or reproducing apparatuses, and more particularly to an optical pickup device enabling recording and/or reproducing with two or more types of recording media.

2. Description of Prior Art

An optical writing and/or reading system carries out recording and/or reproducing of information such as video, audio or other data to/from a recording medium. In such system, a semiconductor laser is used for generating a laser beam, and an objective lens is used for converging the laser beam and forming a focused spot on the recording medium. The recording density of the recording medium is determined by the size of the focused spot. In general, the size of the focused spot (S) is proportional to the wavelength ($\lambda$), and inversely proportional to the numerical aperture (NA), as expressed by formula (1):

$$S \propto \lambda / NA \quad (1)$$

Therefore, to increase the recording density, the size of the spot being focused on the optical disk must be reduced. To reduce the spot size, as can be inferred from formula (1), the wavelength ($\lambda$) of the laser beam must be reduced and/or the numerical aperture (NA) of the objective lens must be increased. This has been demonstrated by the ongoing development of optical recording media. For example, the wavelength of read beams for compact disks (CDs) is about 780 nm, the wavelength of read beams for digital versatile disks (DVDs) is about 650 nm, and the wavelength of read beams for high-definition DVDs (HD-DVDs) is about 405 nm. Furthermore, the numerical aperture for CDs is 0.45, the numerical aperture for DVDs is 0.6, and the numerical aperture for HD-DVDs is 0.65-0.8.

On the other hand, coma aberration, which occurs due to a tilting of the optical disk, is associated with the tilt angle of the disk, the refractive index of the disk substrate, the thickness of the disk substrate, and the numerical aperture of the objective lens. To ensure an acceptable level of coma aberration with respect to the tilt of a disk for high-density recording, the thickness of the disk substrate is in general reduced accordingly. For example, CDs have a thickness of 1.2 mm, and DVDs have a thickness of 0.6 mm. Further, the thickness of many HD-DVDs is 0.6 mm or less.

In an apparatus for high-density recording onto or playing from a medium such as a HD-DVD, a primary consideration is the compatibility of the apparatus with existing disks including CDs and DVDs. Conventionally, there are two kinds of optical writing and/or reading systems that are used in multi-compatible home entertainment players. In the first kind of optical writing and/or reading system, an independent optical system is provided therein for each type of disk. That is, generally, the optical writing and/or reading system has at least three light sources and three objective lenses for these disks. This kind of writing and/or reading system needs too many optical elements, and is unduly large and costly. In the second kind of writing and/or reading system, there are some common optical elements that function for both existing disks and for HD-DVDs; for example, a common objective lens. This kind of writing and/or reading system reduces the total number of optical elements and simplifies the overall configuration. However, the optical performance of the optical pickup head is limited. In respect of the common objective lens, chromatic aberration occurs because each kind of disk operates according to different wavelengths. Further, spherical aberration occurs because the disks have different thicknesses.

SUMMARY OF THE INVENTION

Accordingly, an object of the present invention is to provide an optical pickup device for high-density recording/reproduction which has a single objective lens, and in which chromatic aberration related to different wavelengths of light and/or spherical aberration due to thickness variations of optical disks is corrected.

To achieve the above object, an optical pickup device compatible with at least two types of optical recording media in accordance with the present invention includes: a first light source emitting a first laser beam with a first wavelength; a second light source emitting a second laser beam with a second wavelength greater than the first wavelength; an objective lens with parameters according with the first wavelength and adapted to focus the first and second laser beams on the at least two types of optical recording media; a collimating lens for collimating an incident beam of light and transmitting the collimated light beam to the objective lens; an optical path synthesizer/separator for receiving the first and second laser beams and transmitting the first and second laser beams to the collimating lens; and a compensator for correcting the second laser beams and transmitting the corrected second laser beams to the optical path synthesizer/separator.

Other objects, advantages and novel features of the present invention will be drawn from the following detailed description of preferred embodiments of the present invention with the attached drawings, in which:

DETAILED DESCRIPTION OF PREFERRED EMBODIMENTS

Figure 1:
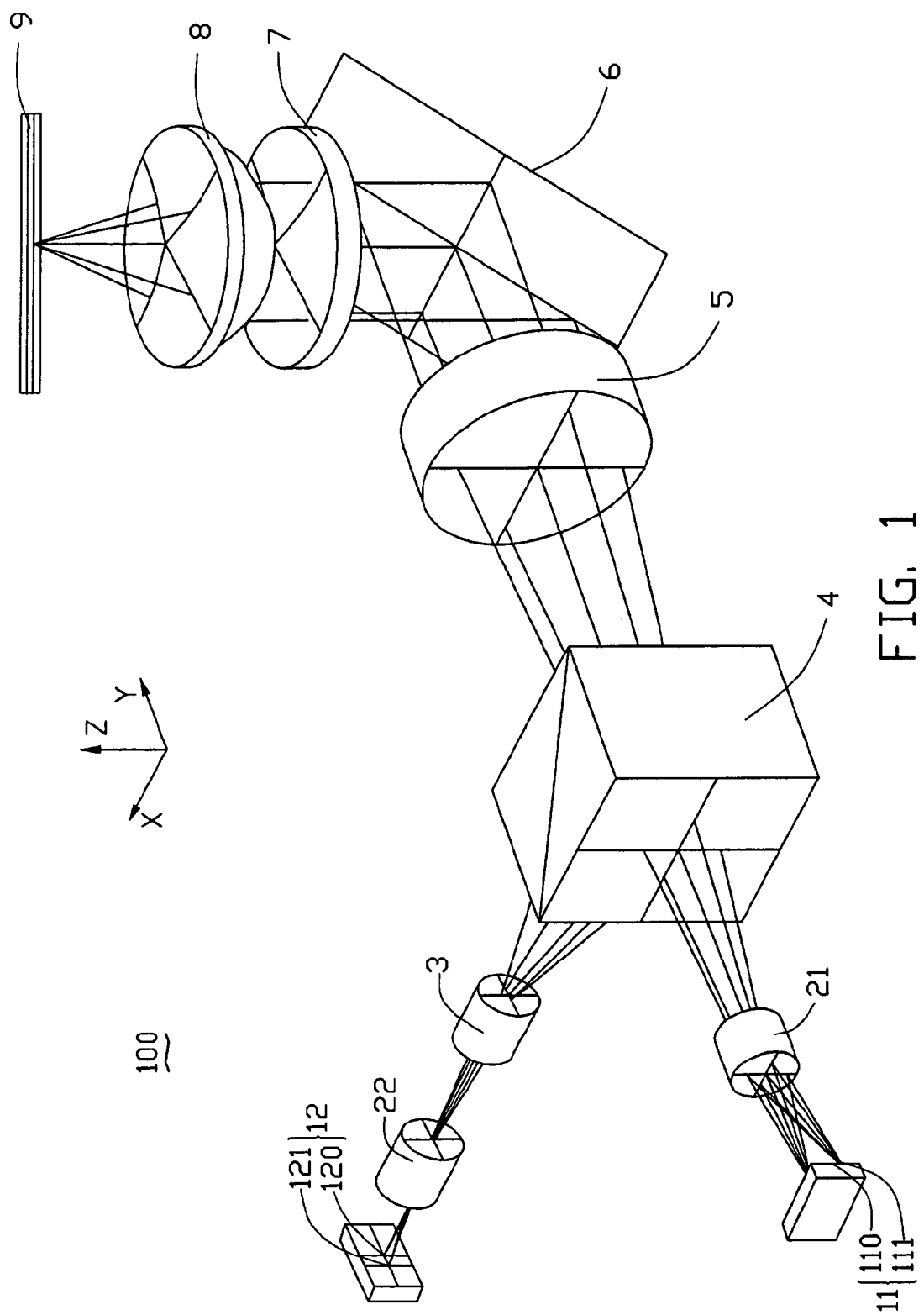
FIG. 1 illustrates an optical arrangement of an optical pickup device for high-density recording/reproduction according to a first embodiment of the present invention.

Referring to FIG. 1, an optical pickup device 100 compatible with recording media having different formats according to a first embodiment of the present invention is illustrated. The optical pickup device 100 includes first and second semiconductor modules 11 and 12 which handle laser beams having different wavelengths, and an objective lens 8 facing an optical disk 9 for focusing an incident beam on the optical disk 9. The first semiconductor 11 integrates a first light source 110 generating a laser beam (not labeled) with a first photo detector 111. The first photo detector 111 is for receiving the laser beam generated by the first light source 110 and reflected from the optical disk 9. The second semiconductor 12 integrates a second light source 120 generating a laser beam (not labeled) with a second photo detector 121. The second photo detector 121 is for receiving the laser beam generated by the second light source 110 and reflected from the optical disk 9. An optical path synthesizer/separator 4 is positioned on a first optical path from the first light source 110 to the objective lens 8, and on a second optical path from the second light source 120 to the objective lens 8. The optical path synthesizer/separator 4 transmits the laser beam from the first light source 110 toward the optical disk 9, and reflects the laser beam from the second light source 120 toward the optical disk 9. Thus, a common optical path shared by the first and second optical paths is formed between the optical path synthesizer/separator 4 and the objective lens 8.

A collimating lens 5, an optical path changer 6 and a wavelength selector 7 are sequentially arranged in the common optical path. The optical path changer 6 can be a mirror. The wavelength selector 7 has different transmissivities according to the different wavelengths. A first diffraction grating 21 is positioned on the first optical path between the first light source 110 and the optical path synthesizer/separator 4. A second diffraction grating 22 and a compensator 3 are positioned on the second optical path between the second light source 120 and the optical path synthesizer/separator 4.

In the present embodiment, the optical disk 9 is either a first optical disk or a second optical disk. The first and second optical disks have different formats. The first optical disk may be a future generation digital versatile disk which has a great numerical aperture and corresponds to a short wavelength; for example, an HD-DVD. The second optical disk may be a DVD, which has a small numerical aperture and corresponds to a long wavelength. The first optical path is used for recording an information signal on and/or reproducing an information signal from the first optical disk. The laser beam generated by the first light source 110 has a relatively short wavelength of about 405 nm, which is suitable for the first optical disk. The laser beam generated by the second light source 120 has a relatively long wavelength of about 650 nm, which is suitable for the second optical disk. Further, both the collimating lens 5 and the objective lens 8 have optical parameters according with the short wavelength for the first optical disk, and the objective lens 8 also has a great numerical aperture according with the first optical disk.

When recording an information signal on and/or reproducing an information signal from the first optical disk, the first light source 110 emits first laser beams having a wavelength of about 405 nm. Then, after passing through the first diffraction grating 21 along the original direction thereof, the first laser beams are transmitted to the optical path synthesizer/separator 4. The optical path synthesizer/separator 4 transmits the first laser beams from the first light source 110 directly therethrough, such that the first laser beams maintain their original direction. After passing through the optical path synthesizer/separator 4, the first laser beams are condensed by the collimating lens 5 and transformed into a first luminous flux of parallel light beams. Because the collimating lens 5 accords with the first optical disk, the beams of the first luminous flux are fully parallel to each other. The first luminous flux is transmitted to the optical path changer 6, which changes the transmitting direction toward the optical disk 9. After being reflected by the optical path changer 6, the first luminous flux illuminates the wavelength selector 7. The wavelength selector 7 does not block any of the first luminous flux, so that the first luminous flux completely passes through the wavelength selector 7 and is incident on the objective lens 8. The objective lens 8 converges the first luminous flux to a light spot (not labeled) on the first optical disk.

After forming the light spot on the first optical disk, the first optical disk reflects the incident beams as first return beams (not labeled). The first return beams sequentially pass through/from the objective lens 8, the wavelength selector 7, the optical path changer 6, the collimating lens 5, and the optical path synthesizer/separator 4, and reach the first diffraction grating 21. The first diffraction grating 21 diffracts the first return beams toward the first photo detector 111. Then, the first photo detector 111 receives the first return beams and generates corresponding electrical signals.

In the first optical path, the parameters of all the components accord with the first optical disk. In particular, the objective lens 8 matches the parameters of the first optical disk, such as the wavelength, the numerical aperture and the thickness of the substrate of the first optical disk. Therefore, the objective lens 8 avoids chromatic aberration and spherical aberration in the first optical path.

When recording an information signal on and/or reproducing an information signal from the second optical disk, the second light source 120 emits second laser beams having a wavelength of about 650 nm. Then, after passing through the second diffraction grating 22 along an original direction thereof, the second laser beams are transmitted to the compensator 3. The compensator 3 is a converging lens; for example, an aspherical lens. The second laser beams are converged a first time by the compensator 3 and transmitted to the optical path synthesizer/separator 4. The optical path synthesizer/separator 4 reflects the second laser beams to the collimating lens 5. The second laser beams are converged a second time by the collimating lens 5, and are thus transformed into a second luminous flux of substantially parallel light beams. The second luminous flux is transmitted to the optical path changer 6, which changes the transmitting direction toward the second optical disk. After being reflected by the optical path changer 6, the second luminous flux illuminates the wavelength selector 7. The wavelength selector 7 transmits a center part of the second luminous flux, and blocks a peripheral part of the second luminous flux. That is, only the center part of the second luminous flux passes through the wavelength selector 7 and is incident on the objective lens 8. The objective lens 8 converges the center part of the second luminous flux to a light spot (not labeled) on the second optical disk.

After forming the light spot on the second optical disk, the second optical disk reflects the incident beams as second return beams (not labeled). The second return beams sequentially pass through/from the objective lens 8, the wavelength selector 7, the optical path changer 6, the collimating lens 5, the optical path synthesizer/separator 4, and the compensator 3, and reach the second diffraction grating 22. The second diffraction grating 22 diffracts the second return beams toward the second photo detector 121. Then, the second photo detector 121 receives the second return beams and generates corresponding electrical signals.

In the second optical path, three converging lenses (i.e., the compensator 3, collimating lens 5 and objective lens 8) are used to focus the second laser beams on the second optical disk. Therefore, any spherical aberration caused by lack of matching between the second luminous flux and the collimating lens 5 and objective lens 8 is corrected. Furthermore, the wavelength selector 7 is used to control the second luminous flux incident on the objective lens 8, so that the numerical aperture of the objective lens 8 accords with the second optical disk.

Hence, any aberrations of the first and second laser beams generated along the first and second optical paths are eliminated by the relatively simple configuration of the optical pickup device 100. This enables high quality information signal recording and/or reproduction. Furthermore, the first light source 110 and the first photo detector 111 adjoin each other in a single unified package, and the second light source 120 and the second photo detector 121 adjoin each other in a single unified package. Therefore the emission path and the return path of the first optical path can share the same optical elements, and the emission path and the return path of the second optical path can share the same optical elements. This reduces the total number of optical elements needed, and further simplifies the configuration of the optical pickup device 100. Thus the optical pickup device 100 has a reduced size and lowers costs.

Figure 2:
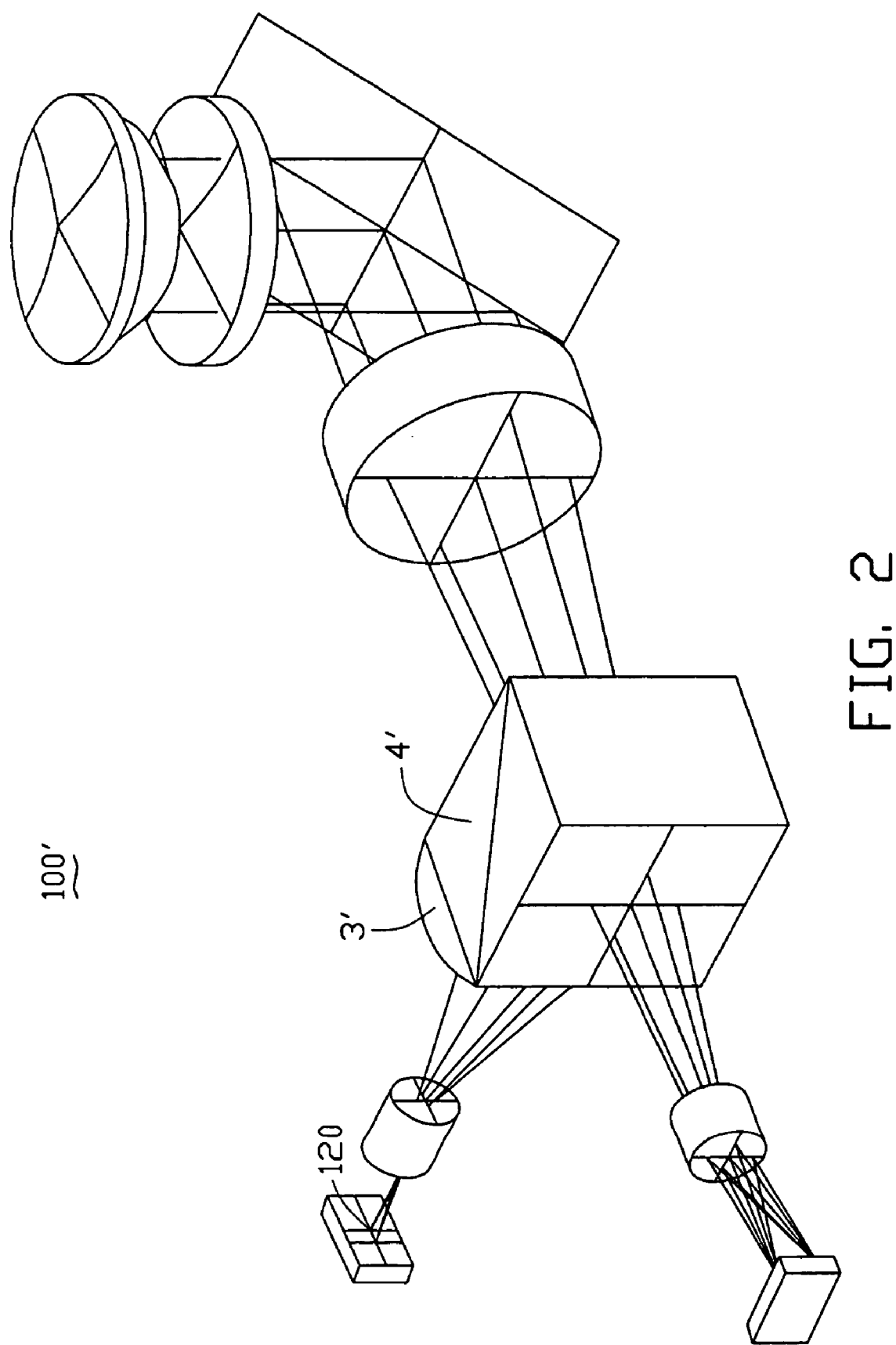
FIG. 2 illustrates an optical arrangement of an optical pickup device for high-density recording/reproduction according to a second embodiment of the present invention.

Referring to FIG. 2, an optical pickup device 100' compatible with recording media having different formats according to a second embodiment of the present invention is illustrated. Unlike in the optical pickup device 100 of the first embodiment, the optical pickup device 100' includes an optical path synthesizer/separator 4' and a compensator 3' that are integrated together. The compensator 3' is formed on a surface of the optical path synthesizer/separator 4' which faces the second light source 120, thereby giving the optical pickup device 100' a further simplified configuration.

Although the present invention has been described with reference to specific embodiments, it should be noted that the described embodiments are not necessarily exclusive, and that various changes and modifications may be made to the described embodiments without departing from the scope of the invention as defined by the appended claims.

What is claimed is:

1. An optical pickup device compatible with at least two types of optical recording media, comprising:
   a first light source emitting a first laser beam with a first wavelength;
   a second light source emitting a second laser beam with a second wavelength greater than the first wavelength;
   an objective lens with parameters according with the first wavelength and adapted to focus the first and second laser beams on the at least two types of optical recording media;
   a collimating lens for collimating an incident beam of light and transmitting the collimated light beam to the objective lens;
   an optical path synthesizer/separator for receiving the first and second laser beams and transmitting the first and second laser beams to the collimating lens; and
   a compensator for correcting the second laser beams and transmitting the corrected second laser beams to the optical path synthesizer/separator.

2. The optical pickup device according to claim 1, wherein the optical path synthesizer/separator directly transmits the first laser beam and reflects the second laser beam.

3. The optical pickup device according to claim 1, wherein the compensator is an aspherical lens.

4. The optical pickup device according to claim 1, wherein the optical path synthesizer/separator and the compensator are integrated together.

5. The optical pickup device according to claim 1, wherein a numerical aperture of the objective lens accords with an optical recording medium of the at least two types of optical recording media which has a highest density of recorded and/or recordable information.

6. The optical pickup device according to claim 5, further comprising a wavelength selector located in an optical path between the collimating lens and the objective lens.

7. The optical pickup device according to claim 6, wherein the wavelength selector does not block any of the first laser beam, and blocks a peripheral part of the second laser beam.

8. The optical pickup device according to claim 1, wherein the objective lens is adapted to optimally focus light beams on one of the at least two kinds of optical recording media according to a thickness of a substrate of said one of the at least two kinds of optical recording media.

9. The optical pickup device according to claim 1, further comprising a first diffraction grating located in an optical path between the first light source and the optical path synthesizer/separator, for diffracting a return beam of the first laser beam, and a second diffraction grating located in an optical path between the second light source and the compensator, for diffracting a return beam of the second laser beam.

10. The optical pickup device according to claim 1, further comprising a first photo detector adjoining the first light source thereby defining a first unified package, and a second photo detector adjoining the second light source thereby defining a second unified package.

11. An optical pickup device compatible with first and second optical recording media, wherein the first optical recording medium is a high density recording medium, and the optical pickup device comprises:
    a first light source emitting a first laser beam with a first wavelength according with the first optical recording medium;
    a second light source emitting a second laser beam with a second wavelength greater than the first wavelength;
    an objective lens with a wavelength and a numerical aperture according with the first optical recording medium;
    a collimating lens with a wavelength according with the first optical recording medium for collimating an incident beam of light and transmitting the collimated light beam to the objective lens;
    an optical path synthesizer/separator for receiving the first and second laser beams and transmitting the first and second laser beams to the collimating lens; and
    a compensator for correcting the second laser beams and transmitting the corrected second laser beams to the optical path synthesizer/separator.

12. An optical pickup device compatible with first and second optical recording media, comprising:
    a first light source emitting a first laser beam with a first wavelength according with said first optical recording medium;
    a second light source emitting a second laser beam with a second wavelength different from said first wavelength, said second wavelength according with said second optical recording medium;
    an objective lens for receiving said first and second laser beams from said first and second light sources and transmitting said first and second laser beams to said first and second optical recording media;
    a wavelength selector disposed in a laser-passing path between said objective lens and said first and second light sources for limiting transmission of one of said first and second laser beams through said wavelength selector; and
    a compensator for correcting one of said first and second laser beams before said one of said first and second laser beams reaches said objective lens.

13. The optical pickup device according to claim 12, wherein an optical path synthesizer/separator is disposed in said laser-passing path between said wavelength selector and said first and second light sources so as to define a single branch of said path toward said objective lens and two diverged branches of said path toward said first and second light sources respectively.

14. The optical pickup device according to claim 13, wherein a photo detector is disposed closely next to said first and second light sources so as to use the same two diverged branches of said path for receiving reflective laser beams from said first and second optical recording media.

15. The optical pickup device according to claim 13, wherein said optical path synthesizer/separator and said compensator are integrated together.

16. The optical pickup device according to claim 12, wherein a collimating lens is disposed in said laser-passing path between said objective lens and said first and second light sources to collimate one of said first and second laser beams.

17. The optical pickup device according to claim 12, wherein a numerical aperture of said objective lens accords with an optical recording medium of said first and second optical recording media which has a highest density of recorded and/or recordable information.

18. The optical pickup device according to claim 12, further comprising a diffraction grating located in an optical path between one of said first and second light sources and said optical path synthesizer/separator for diffracting a return beam of a corresponding one of said first and second laser beams.

* * * * *